US008243684B2

(12) United States Patent
Yokota

(10) Patent No.: US 8,243,684 B2
(45) Date of Patent: Aug. 14, 2012

(54) RADIO COMMUNICATION APPARATUS AND COMMUNICATION CONTROL METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 564 days.

(21) Appl. No.: 12/342,597

(22) Filed: Dec. 23, 2008

(65) Prior Publication Data
US 2009/0176493 A1    Jul. 9, 2009

(30) Foreign Application Priority Data

Dec. 27, 2007   (JP) .................................. 2007-338144

(51) Int. Cl.
*H04W 4/00* (2009.01)
(52) U.S. Cl. ........ 370/331; 370/338; 455/437; 455/438; 455/439
(58) Field of Classification Search .......... 370/328–339, 370/401; 455/436–444
See application file for complete search history.

(56) References Cited

U.S. PATENT DOCUMENTS

| | | | |
|---|---|---|---|
| 7,742,766 B2* | 6/2010 | Liu et al. ........................ | 455/436 |
| 8,050,680 B2* | 11/2011 | Won et al. ...................... | 455/436 |
| 2006/0052563 A1 | 3/2006 | Nakagawa et al. | |
| 2006/0274699 A1* | 12/2006 | Faccin ........................... | 370/331 |
| 2006/0291417 A1 | 12/2006 | Aust et al. | |
| 2008/0280614 A1* | 11/2008 | Zuniga et al. .................. | 455/436 |
| 2009/0067623 A1* | 3/2009 | Lei et al. ......................... | 380/44 |
| 2010/0297996 A1* | 11/2010 | Yokota ........................... | 455/436 |

FOREIGN PATENT DOCUMENTS

| | | | |
|---|---|---|---|
| JP | 2007124622 A | 5/2007 | |
| KR | 2006-0120064 A | 11/2006 | |

OTHER PUBLICATIONS

"Draft Standard for Local and Metropolitan Area Networks: Media Independent Handover Services" LAN MAN Standards Committee of the IEE Computer Society, pp. ii-280, Feb. 2007.
Official Action issued on Oct. 28, 2010 in the counterpart Korean application with English translation lists the references above.
LAN MAN Standards Committee of the IEEE Computer Society. "Draft Standard for Local and Metropolitan Area Networks: Media Independent Handover Services" IEEE P802.21/D7.1, pp. 12-15, 46-46, 186, 206, 285-286, Aug. 2007.
Chinese language office action dated Jan. 19, 2011 and its English language translation for corresponding Chinese application 200810188604.8 lists the relevant non-patent document above.
Japanese language office action dated Dec. 6, 2011 and its English language translation issued in corresponding Japanese application 2007338144 cites the U.S. patent application publication and foreign patent documents above.

* cited by examiner

*Primary Examiner* — Christopher Grey
(74) *Attorney, Agent, or Firm* — DLA Piper LLP (US)

(57) ABSTRACT

An objective of the present invention is to provide a radio communication apparatus and a communication control method capable of executing processing including a handover appropriate for a communication quality of a radio link while suppressing an increase in development cost, when a handover controller is provided between a mobility manager and a link controller. An MIH function unit sets a communication quality threshold of a radio link in a radio link controller, the communication quality threshold being associated with a service quality requirement value notified by the mobility manager. The MIH function unit also notifies a mobility manager that the service quality requirement value corresponding to the communication quality threshold is satisfied, when being notified by the link controller that the communication quality of the radio link reaches the communication quality threshold.

7 Claims, 9 Drawing Sheets

FIG. 5

```
MIH_Configure_Link.request  (
                            DestinationIdentifier ,
                            LinkIdentifier ,
                            ConfigurationRequestList
                            )
```

FIG. 6

MIH_QoS_Threshold. request = (
    MIH User ID ,
    The number of QoS parameter ,
    The number of thresholds ,
    Threshold 1 for QoS parameter 1
    Threshold i for QoS parameter 1
    Threshold n for QoS parameter 1
    ⋮
    Threshold n for QoS parameter m
)

Example

MIH User ID = 1 ( VoIP application )
The number of QoS parameter = 2 (Bandwidth(Rate) , Delay )
The number of thresholds
Threshold 1 for Bandwidth = 4Kbps
Threshold 2 for Bandwidth = 8Kbps
Threshold 3 for Bandwidth = 12Kbps
Threshold 4 for Bandwidth = 16Kbps
Threshold 5 for Bandwidth = 24Kbps
Threshold 6 for Bandwidth = 32Kbps
Threshold 7 for Delay = 200 ms
Threshold 8 for Delay = 300 ms
Threshold 9 for Delay = 400 ms

FIG. 7

```
Link_Configure_Threshold. request (
    New_Link_Parameters_List
)

New_Link_Parameters_List" =
    Link Parameter Type ,
    Priority of Link ,
    InitiateActionThreshold ,
    ExecuteActionThreshold ,
    Logical equation to judge listed parameters with InitiateAction Threshold ,
    Logical equation to judge listed parameters with ExecuteAction Threshold ,
    Interval for Judgment ,
    QoS_Related_Threshold 1 ,
    QoS_Related_Threshold 2 ,
    QoS_Related_Threshold 3 ,
    QoS_Related_Threshold 4 ,
    QoS_Related_Threshold 5 ,
    QoS_Related_Threshold 6 ,
    QoS_Related_Threshold 7 ,
    QoS_Related_Threshold 8 ,
    QoS_Related_Threshold 9 ,
    Logical equation to judge listed parameters for QoS_Related_Threshold 1 ,
    Logical equation to judge listed parameters for QoS_Related_Threshold 2 ,
    Logical equation to judge listed parameters for QoS_Related_Threshold 3 ,
    Logical equation to judge listed parameters for QoS_Related_Threshold 4 ,
    Logical equation to judge listed parameters for QoS_Related_Threshold 5 ,
    Logical equation to judge listed parameters for QoS_Related_Threshold 6 ,
    Logical equation to judge listed parameters for QoS_Related_Threshold 7 ,
    Logical equation to judge listed parameters for QoS_Related_Threshold 8 ,
    Logical equation to judge listed parameters for QoS_Related_Threshold 9 ,
```

FIG. 8

Link_Parameters_Report.indication (
    LinkIdentifier,
    LinkParametersReportList
)

LinkParametersReportList =
    ParameterType,
    oldValueofLinkParameter,
    newValueOfLinkParameter,
    kind of action (InitiateAction or ExecuteAction or QoS_Action1~N),
    logical equation

FIG. 9

MIH_Link_Parameters_Report.indication (
        SourceIdentifier ,
        DestinationIdentifier ,
        LinkIdentifier ,
        LinkParametersStatusList ,
        QoSParametersStatusList ,
)

RADIO COMMUNICATION APPARATUS AND COMMUNICATION CONTROL METHOD

CROSS REFERENCE TO RELATED APPLICATION

This application is based upon and claims the benefit of priority from the prior Japanese Patent Application No. 2007-338144, filed on Dec. 27, 2007; the entire contents of which are incorporated herein by reference.

BACKGROUND OF THE INVENTION

1. Field of the Invention

The present invention relates to a radio communication apparatus and a communication control method for executing a handover from a first radio communication network to a second radio communication network employing a different radio communication scheme from that employed by the first radio communication network.

2. Description of the Related Art

In recent years, along with advancement of radio communication technologies, a radio communication apparatus connectable to multiple radio communication networks employing different radio communication schemes has been put in practical use.

Such a radio communication apparatus includes a media independent handover user (MIH user, or mobility manager) for managing mobility among multiple radio communication networks, and multiple link controllers for setting the radio communication networks and radio links respectively.

Moreover, it has been proposed that a media independent handover function unit (MIH function unit, or handover controller) for controlling a handover between the radio communication networks (in other words, a handover between systems) is provided between the mobility manager and the multiple link controllers in the aforementioned radio communication apparatus connectable to the multiple communication networks (for example, IEEE P802.21/D04.00 Draft IEEE Standard for Local and Metropolitan Area Networks: Media Independent Handover Services, LAN MAN Standards Committee of the IEEE Computer Society (hereinafter, referred to as Non-Patent Document 1)).

The method described in Non-Patent Document 1, however, has the following problems. Generally speaking, a higher layer entity such as the mobility manager or an application (IP phone, for example) is capable of determining degradation of quality of service (QoS) in the higher layer entity, but does not recognize the relationship between the degree of degradation and the communication quality of the radio link. For this reason, there is a problem that the radio communication apparatus cannot execute a handover at timing an appropriate for the communication quality of the radio link even though the radio communication apparatus is provided with the handover controller. Due to this problem, the quality of the application cannot be maintained adaptively.

For the purpose of solving the aforementioned problem, the mobility manager may set a communication quality threshold in the handover controller to have a value appropriate for the communication quality of the radio link. Such a mobility manager, however, needs to be developed in consideration of each of the radio communication networks in terms of the processing procedure from the determination of the communication quality of the radio link to the execution of the handover. The development of the mobility manager taking all of the radio communication networks into consideration as described above raises another problem that the cost for the mobility manager increases.

SUMMARY OF THE INVENTION

The present invention thus has been made in view of the situation described above. An objective of the present invention is thus to provide a radio communication apparatus and a communication control method capable of executing the processing including an appropriate handover corresponding to a communication quality of a radio link while suppressing an increase in development cost, in a case where a handover controller is provided between a mobility manager and link controllers.

In order to resolve the aforementioned problems, the present invention has the following aspects. To begin with, a first aspect of the present invention is summarized as a radio communication apparatus (radio communication terminal 10) executing a handover from a first radio communication network (radio communication network 100, for example) to a second radio communication network (radio communication network 200, for example) employing a radio communication scheme different from the first radio communication network, the apparatus comprising: a link controller (radio link controllers 12A to 12C) configured to set a radio link (radio link RL) to one of the first radio communication network and the second radio communication network; a mobility manager (mobility manager 14) configured to manage a mobility of the radio communication apparatus from the first radio communication network to the second radio communication network; and a handover controller (MIH function unit 13) configured to control a handover from the first radio communication network to the second radio communication network, wherein the mobility manager notifies the handover controller of a service quality requirement value (required bandwidth (communication rate), for example) in a higher layer entity (higher layer entity 15) of the mobility manager, the handover controller sets a communication quality threshold (RSSI or CINR, for example) of the radio link to the link controller, the communication quality threshold being associated with the service quality requirement value notified by the mobility manager, and when the handover controller is notified by the link controller that a communication quality of the radio link reaches the communication quality threshold (Link_Parameters. Report. indication), the handover controller notifies the mobility manager that the service quality requirement value corresponding to the communication quality threshold is satisfied.

According to the aforementioned radio communication apparatus, when the handover controller is notified by the link controller that the communication quality of the radio link set reaches the communication quality threshold, the handover controller notifies the mobility manager that the service quality requirement value corresponding to the communication quality threshold is satisfied (MIH_Link_Parameters_Report. indication).

The mobility manager can thus promptly determine to change the service quality requirement value in the mobility manager or the service quality requirement value for the higher layer entity of the mobility manager, or to execute the handover, when being notified by the handover controller that the service quality requirement value is satisfied.

Specifically, since the handover controller associates communication quality thresholds with service quality requirement values, the mobility manager does not have to recognize the relationship between each of the service quality requirement values and each of the communication quality thresholds dependent on the characteristics of the radio communication network. The mobility manager thus can execute processing such as a handover appropriate for the communication quality of the radio link on the basis of the service quality requirement values. In addition, since the mobility manager does not have to recognize the relationship between each of the communication quality thresholds and each of the service quality requirement values, which are dependent on the characteristics of the radio communication networks, the development cost of the mobility manager can be suppressed.

A second aspect of the present invention is summarized as the radio communication apparatus according to the first aspect, wherein the link controller notifies (Link_Parameters_Report. indication) the handover controller that the communication quality reaches the communication quality threshold when the communication is quality of the radio link reaches the communication quality threshold set by the handover controller.

A third aspect of the present invention is summarized as the radio communication apparatus according to one of the first and second aspects, wherein the mobility manager executes the handover when the mobility manger is notified by the handover controller that the the service quality requirement value is satisfied.

A fourth aspect of the present invention is summarized as the radio communication apparatus according to one of the first and second aspects, wherein the mobility manager changes a setting content in the higher layer entity when the mobility manger is notified by the handover controller that the service quality requirement value is satisfied.

A fifth aspect of the present invention is summarized as the radio communication apparatus according to one of the first and second aspects, wherein the handover controller sets a logical equation for determining whether or not the communication quality of the radio link reaches a predetermined threshold, to the link controller as the communication quality threshold.

A sixth aspect of the present invention is summarized as a communication control method for a radio communication apparatus (radio communication terminal 10) including: an MIH user (mobility manager 14) configured to manage a mobility from a first radio communication network (radio communication network 100, for example) to a second radio communication network (radio communication network 200, for example) employing a radio communication scheme different from the first radio communication network; an MIH function unit (MIH function unit 13) configured to control a handover from the first radio communication network to the second radio communication network; and a link controller configured to set a radio link (radio link RL) with one of the first communication network and the second radio communication network, the method comprising the steps of: notifying the MIH function unit, by the MIH user, of a service quality requirement value (required bandwidth (communication rate), for example) of a communication service to be executed; setting, by the MIH function unit, a communication quality threshold (RSSI or CINR, for example) of the radio link to the link controller, the communication quality threshold being associated with the service quality requirement value notified by the MIH user; and notifying (MIH_Link_Parameters_Report. indication) the MIH user by the MIH function unit that the service quality requirement value corresponding to the communication quality threshold is satisfied, when the MIH function unit is notified (Link_Parameters_Report. indication) by the link controller that the communication quality of the radio link reaches the communication quality threshold.

A seventh aspect of the present invention is summarized as the communication control method according to the sixth aspect, further comprising: the step of notifying (Link_Parameters_Report. indication) the MIH function unit by the link controller that the communication quality of the radio link reaches the communication quality threshold, when the communication quality of the radio link reaches the communication quality threshold set by the MIH function unit.

According to the aspects of the present invention, it is possible to provide a radio communication apparatus and a communication control method capable of executing processing including a handover appropriate for the communication quality of a radio link while suppressing an increase in development cost, in a case where a handover controller I a provided between a mobility manager and link controllers.

BRIEF DESCRIPTION OF THE DRAWINGS

FIG. 5 is a diagram showing a format of MIH_Configure_Link. request according to the embodiment of the present invention.

FIG. 6 is a diagram showing a format of MIH_QoS_Threshold. request and a configuration example of MIH_QoS_Threshold. request according to the embodiment of the present invention.

FIG. 7 is a diagram showing a format of Link_Configure_Threshold. request according to the embodiment of the present invention.

FIG. 8 is a diagram showing a format of Link_Parameters_Report. indication according to the embodiment of the present invention.

FIG. 9 is a diagram showing a format of MIH_Link_Parameters_Report. indication according to the embodiment of the present invention.

DETAILED DESCRIPTION OF EMBODIMENTS

Figure 1:
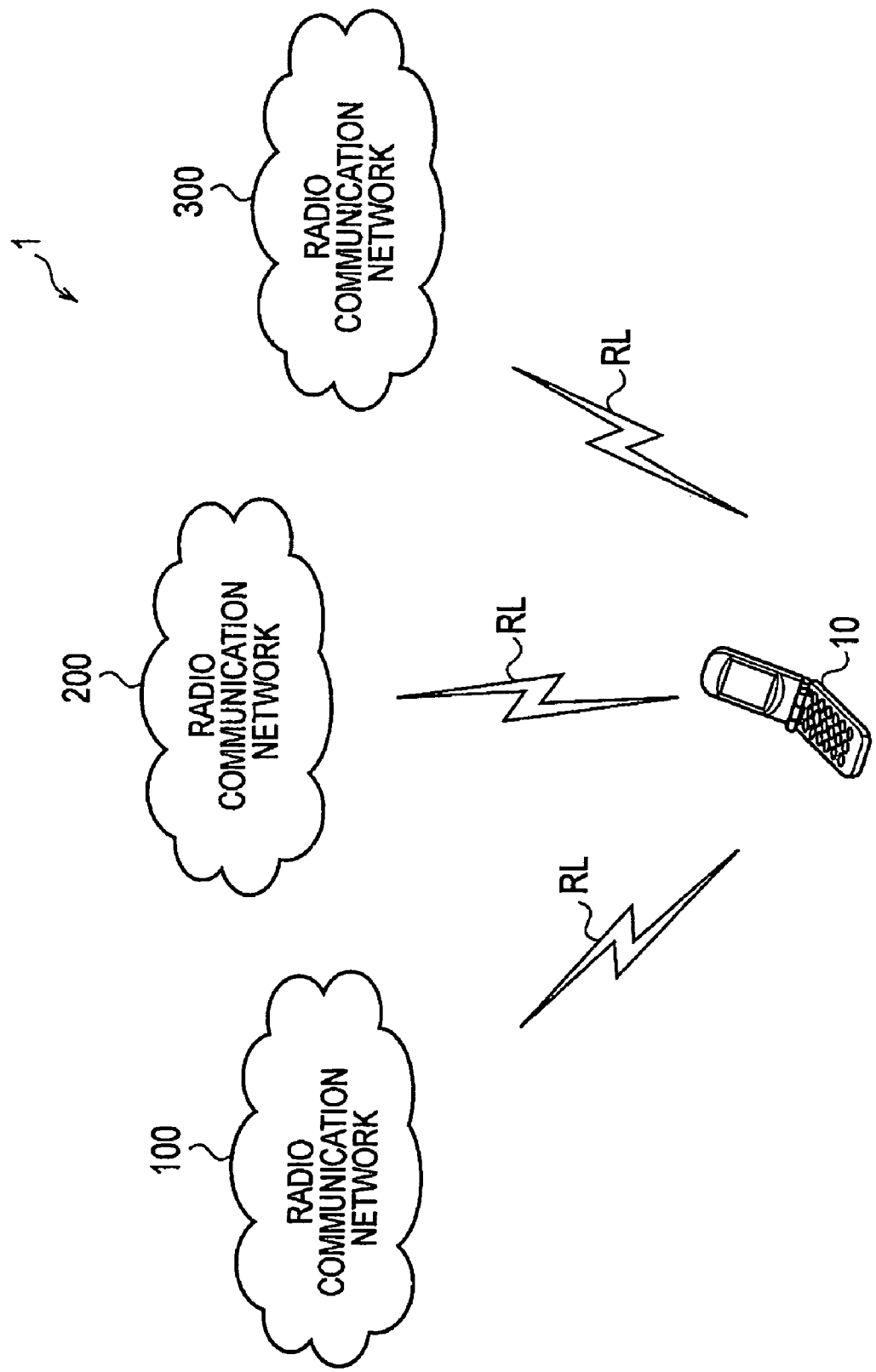
FIG. 1 is an overall schematic configuration diagram of a communication system 1 according to an embodiment of the present invention.

Next, an embodiment of the present invention will be described. Specifically, descriptions will be given of (1) an overall schematic configuration of a communication system, (2) a functional block configuration of a radio communication terminal 10, (3) an operation of the radio communication terminal 10, (4) effects and advantages, and (5) other embodiments.

Note that the same or similar portions are denoted by the same or similar reference numerals in the descriptions of the drawings below. It should be noted, however, that the drawings are schematic only, and that ratios of respective dimensions and the like differ from those in reality.

Accordingly, specific dimensions and the like should be determined in consideration of the descriptions below. In addition, some of the dimensional relations and ratios differ in the drawings as a matter of course.

(1) Overall Schematic Configuration of Communication System

As shown in FIG. 1, a communication system 1 according to the present embodiment is configured of a radio communication terminal 10 and multiple networks (radio communication networks 100, 200 and 300).

The radio communication terminal 10 is capable of executing radio communications with the radio communication networks 100, 200 and 300. Note that the radio communication terminal 10 will be described later in detail.

The radio communication networks 100, 200 and 300 employ radio communication schemes (configurations of physical layers or link layers) different from each other. In this embodiment, the radio communication network 100 employs "1xEV-DO" compliant with CDMA2000. The radio communication network 200 employs "WiMAX" compliant with IEEE802.16e. The radio communication network 300 employs "WLAN" compliant with IEEE802.11.

The radio communication terminal 10 is capable of executing a handover to another radio communication network on the basis of a communication quality of a radio link set with any one of the radio communication networks 100, 200 and 300.

(2) Functional Block Configuration of Radio Communication Terminal 10

Figure 2:
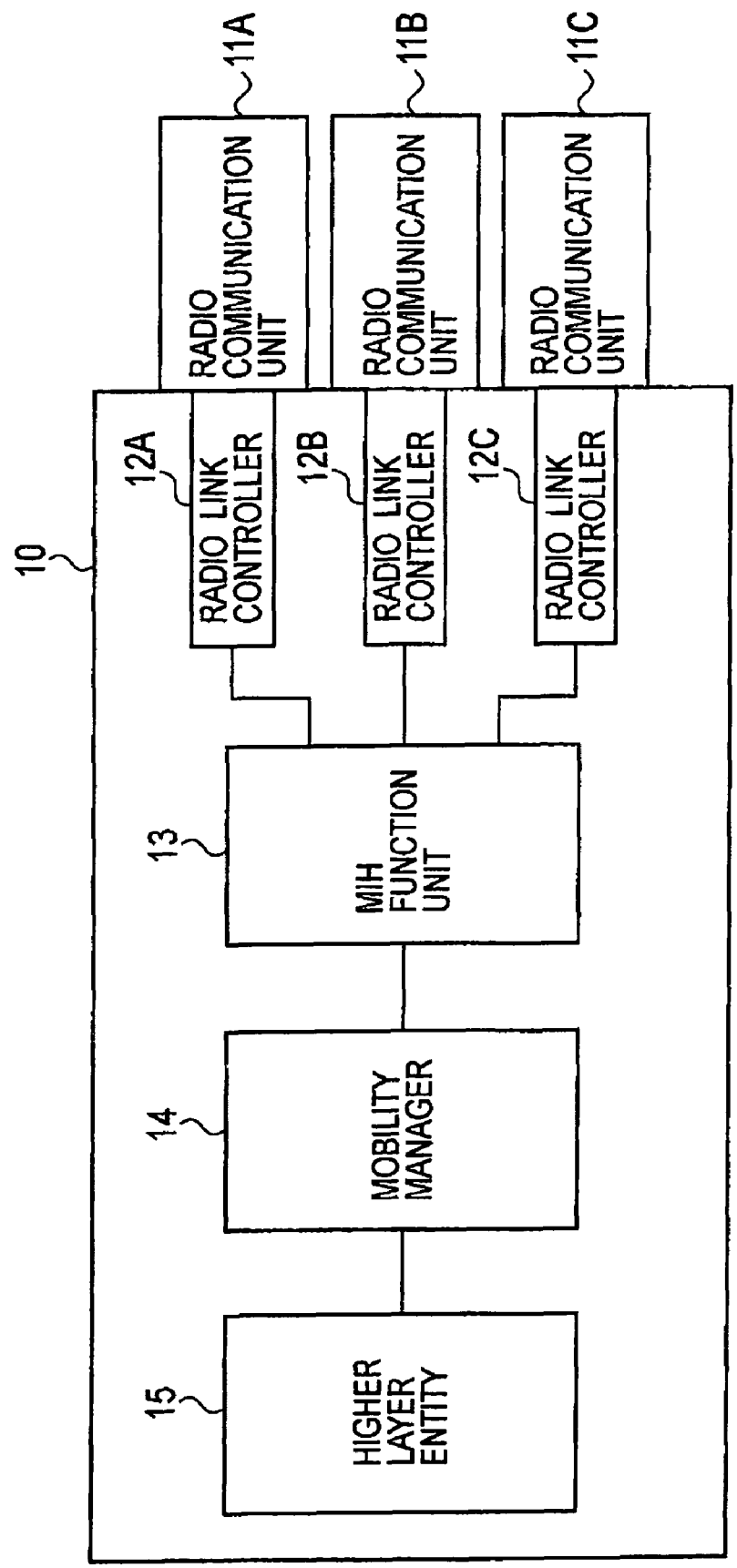
FIG. 2 is a functional block configuration diagram of a radio communication terminal 10 according to the embodiment of the present invention.

FIG. 2 is a functional block configuration diagram of the radio communication terminal 10. Note that FIG. 2 shows functional blocks that are related to the present invention. Accordingly, it is to be noted that there is a case where the radio communication terminal 10 includes a logical block (such as a power supply) indispensable for performing functions as the device although such a logical block is not shown in the drawings, or the description thereof is omitted.

As illustrated in FIG. 2, the radio communication terminal 10 includes radio communication units 11A to 11C, radio link controllers 12A to 12C, an MIH function unit 13, a mobility manager 14 and a higher layer entity 15.

The radio communication units 11A to 11C set a physical radio connection in a physical layer for the radio communication networks 100, 200 and 300 in accordance with an instruction from a higher layer (the higher layer entity 15, for example).

Specifically, the radio communication unit 11 A sets a physical radio connection corresponding to "1xEV-DO" for the radio communication network 100. The radio communication unit 11B sets a physical radio connection corresponding to "WiMAX" for the radio communication network 200. The radio communication unit 11C sets a physical radio connection corresponding to "WLAN" for the radio communication network 300.

The radio link controllers 12A to 12C set a radio link RL in a link layer for the radio communication networks 100, 200 and 300 in accordance with an instruction from a higher layer (the higher layer entity 15, for example).

Specifically, the radio link controller 12A has an interface function (device driver) with the radio communication unit 11A and sets a radio link RL corresponding to "1xEV-DO" for the radio communication network 100. The radio link controller 12B has an interface function (device driver) with the radio communication unit 11B and sets a radio link RL corresponding to "WiMAX" for the radio communication network 200. The radio link controller 12C has an interface function (device driver) with the radio communication unit 11C and sets a radio link RL corresponding to "WLAN" for the radio communication network 300.

In addition, the radio link controller 12A (and the radio link controllers 12B and 12C) acquires information indicating such as a communication quality of the radio link RL set for each radio communication network from the radio communication unit 11A (and the radio communication units 11B and 11C). When the communication quality of the radio link RL reaches a communication quality threshold set by the MIH function unit 13, the radio link controller 12A (and the radio link controllers 12B and 12C) notifies the MIH function unit 13 that the communication quality of the radio link RL reaches the communication quality threshold.

The MIH function unit 13 controls a handover between the radio communication networks in accordance with an instruction from the mobility manager 14, which functions as a higher layer unit of the MIH function unit 13. In this embodiment, the MIH function unit 13 constitutes a handover controller. The MIH function unit 13 is a media independent handover function, which is independent of the configuration of a physical layer, and is defined in IEEE802.21.

The MIH function unit 13 includes "Radio Network Control," which executes mapping of QoS parameters (bandwidth (communication rate), for example) to radio parameters (RSSI, for example) or setting of a logical equation for judgment of the communication quality in the link layer (L2).

The Radio Network Control sets two types of communication quality thresholds of a radio link RL and informs the radio link controller 12A (and the radio link controllers 12B and 12C) of the set communication quality thresholds. Specifically, the Radio Network Control sets InitiateAction Threshold and ExecuteAction Threshold. InitiateAction Threshold is used to determine whether or not to execute a connection to the radio communication network of the handover destination. ExecuteAction Threshold is used to determine whether or not to execute a handover to the radio communication network.

In other words, the MIH function unit 13 controls a handover from any one of the radio communication networks 100, 200 and 300 to another radio communication network. Specifically, the MIH function unit 13 sets the communication quality thresholds (InitiateAction Threshold and ExecuteAction Threshold) of the radio link RL in the radio link controllers 12A to 12C. The communication quality thresholds are associated with service quality requirement values (bandwidth (communication rate) required by the application currently executed, for example) notified by the mobility manager 14. When the MIH function unit 13 is notified by the radio link controllers 12A to 12C that a communication quality of the radio link RL reaches a communication quality threshold, the MIH function unit 13 then notifies the mobility manager 14 that the communication quality of the radio link R reaches the service quality requirement value corresponding to the notified communication quality threshold.

Alternatively, the MIH function unit 13 is also capable of setting the logical equation for judgment for each radio link RL, a logical equation being used to judge whether or not the communication quality of the radio link RL reaches a predetermined threshold as the communication quality threshold. Specifically, the MIH function unit 13 stores contents shown in Tables 10 to 12 to be described later and then sets logical equations for judgment in accordance with the contents stored in the MIH function unit 13.

The mobility manager 14 manages the mobility of the radio communication terminal 10. Specifically, the mobility manager 14 manages the mobility of the radio communication terminal 10 among the radio communication networks 100, 200 and 300. For example, the mobility manager 14 manages the mobility of the radio communication terminal 10 from the radio communication network 100 to the radio communication network 200.

The mobility manager 14 notifies the MIH function unit 13 of a service quality requirement value of a communication service being executed in the higher layer entity 15, which is provided at a layer higher than that of the mobility manager 14.

The mobility manager 14 is capable of executing a handover to another radio communication network when the mobility manager 14 is notified by the MIH function unit 13 that the communication is quality of the radio link RL reaches the communication quality threshold associated with the service quality requirement value. In addition, the mobility manager 14 is also capable of causing the higher layer entity 15 change a setting content (encoding rate of the codes used in an IP phone application, for example), when the mobility manager 14 is notified by the MIH function unit 13 that the communication quality of the radio communication link RL reaches the communication quality threshold associated with the service quality requirement value.

The higher layer entity 15 is provided at a layer higher than that of the mobility manager 14. The higher layer entity 15 is constituted of the fourth layer protocol such as TCP, Network Management Protocol such as Mobile IP, an IP application (IP phone application, for example), a communication path selection policy and the like.

In this embodiment, the mobility manager 14 and the higher layer entity 15 cooperatively function as an MIH User defined in IEEE802.21. Note that the higher layer entity 15 may be configured to function as a part of the mobility manager 14.

(3.1) Operation Example 1

Figure 3:
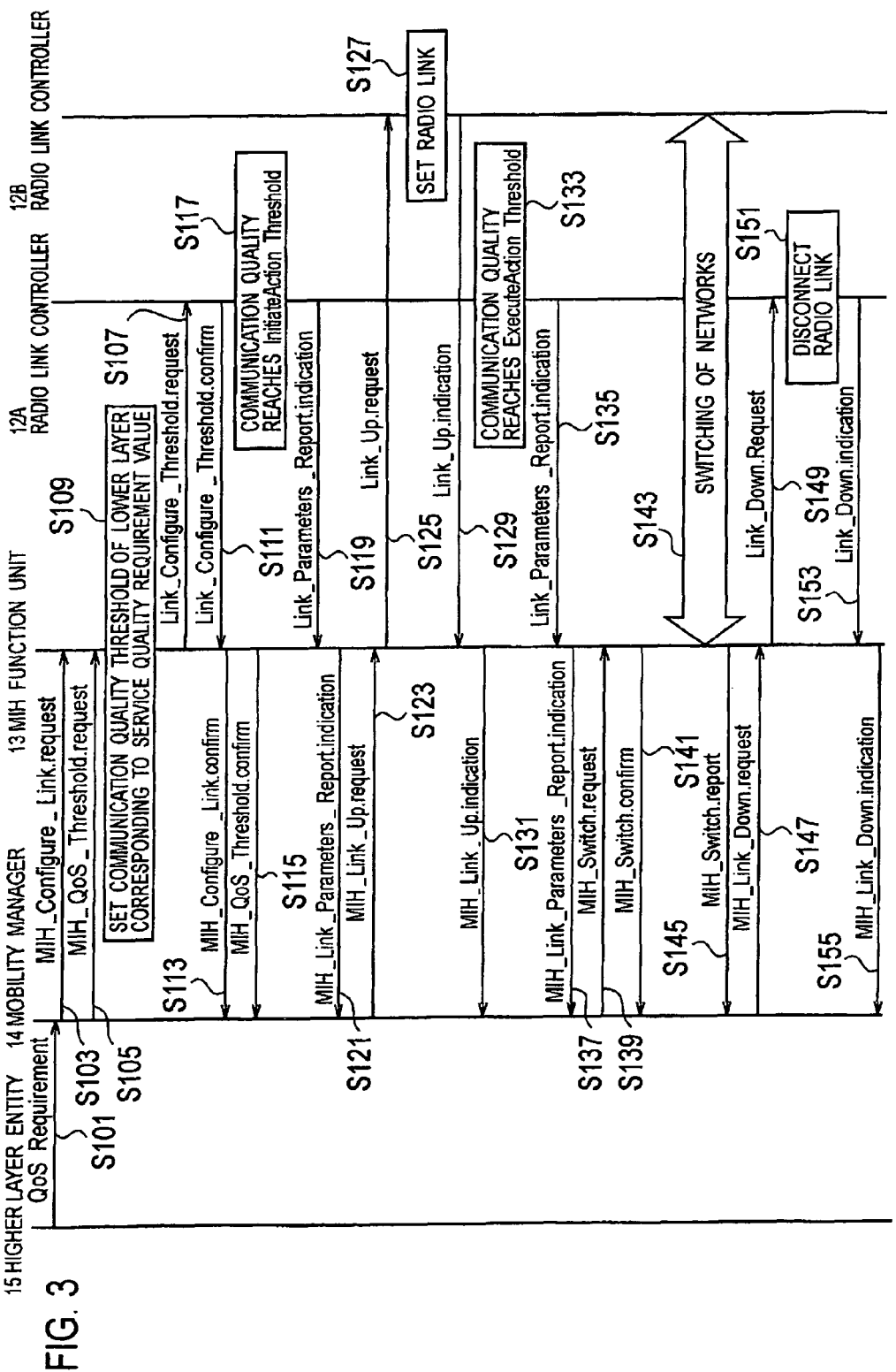
FIG. 3 is an internal sequence diagram when the radio communication terminal 10 according to the embodiment of the present invention executes a handover from a radio communication network 100 to a radio communication network 200 (Operation Example 1).

FIG. 3 is an internal sequence diagram when the radio communication terminal 10 executes a handover from the radio communication network 100 to the radio communication network 200. Note that in this embodiment, the radio communication terminal 10 operates in accordance with the procedure defined in IEEE802.21.

As shown in FIG. 3, in step S101, the higher layer entity 15 transmits a QoS parameter and policy information (QoS Requirement) required by the application currently in execution to the mobility manager 14. Note that the higher layer entity 15 may be configured to function as a part of the mobility manager 14 as described above. In this case, the mobility manager 14 includes the QoS parameter and policy information. The QoS parameters are the required bandwidth (communication rate) for the application, allowable delay time and fluctuation in arrival time of received packets, and the like. Moreover, the policy information is the selection policy of a communication path in accordance with the application, the security level required by the radio communication network to be connected, or the like.

In step S103, the mobility manager 14 transmits MIH_Configure_Link. request to the MIH function unit 13 in order to prepare for the case where a handover is executed on the basis of the communication quality of the radio communication network for which the radio link RL is currently set.

FIG. 5 shows a format of MIH_Configure_Link. request. Moreover, Tables 1 and 2 show the content of each parameter included in MIH_Configure_Link. request.

TABLE 1

| Name | Type | Valid range | Description |
| --- | --- | --- | --- |
| Destination Identifier | MIHF ID | N/A | This identifies the local MIHF or a remote MIHF which will be the destination of this request. |
| Link Identifier | LINK ID | N/A | Identifier of the link to be configured |
| Configuration Requests List | LIST | N/A | List of Configuration Requests, as defined in Table 42 |

TABLE 2

| Table 42—Elements of configuration request | | | |
| --- | --- | --- | --- |
| Name | Type | Valid range | Description |
| Configuration Parameter Type | INTEGER | N/A | Type of parameter to be configured<br>0: Operation Mode<br>1: Link QoS Parameter List<br>2: Link Configure List<br>3: 255(Reserved) |
| Configuration Parameter Value | Varies depending on the parameter type | N/A | Value of the parameter being set as defined in Table 43. |

(3) Operation of Radio Communication Terminal 10

Next, an operation of the aforementioned radio communication terminal 10 will be described. Specifically, a description will be given of the operation of the radio communication terminal 10 for executing a handover from the radio communication network 100 to the radio communication network 200.

MIH_Configure_Link. request includes Configure parameter type and Configure parameter value (refer to Table 2). Furthermore, Handover Parameter for link quality degradation is added as a new element in MIH_Configure_Link. request (Link Configuration Parameter Value) in this embodiment (refer to Tables 3 to 5). Note that hereinafter, underlined portions in Tables indicate that the a portions are added for the contents defined in IEEE802.21.

TABLE 3

Table 43 Link configuration parameter values

| Name | Type | Valid range | Description |
|---|---|---|---|
| Operation Mode | INTEGER | N/A | 0: Power Up<br>1: Power Saving Mode<br>2: Power Down |
| Link QoS Parameter List | LIST | N/A | A list of link QoS parameters and their corresponding values as specified Table 12 |
| Link Configuration Parameter List | LIST | N/A | A list of link parameters and their corresponding thresholds as defined in "Link_Configure_Threshold.request" |
| Handover Parameter for link quality degradation | LIST | N/A | Wireless Access NW Quality Degradation Threshold 1<br>Wireless Access NW Quality Degradation Threshold 2<br>Threshold 1 corresponds to trigger of handover preparation such as establish a new link for handover while threshold 2 corresponds to trigger of handover execution.<br>Note: Two thresholds are decided by MIHF. |

TABLE 4

Table 12—QoS parameter encoding

| Syntax | length | Note |
|---|---|---|
| QoS Parameter Type | 2 | The type of QoS parameter as defined In Table 13 |
| QoS Parameter Value | Variable | The parameter value is dependent on the parameter type. For generic QoS parameters, the encoding is defined in Table 14 |

TABLE 5

Table 13—QoS parameter type encoding

| Syntax | length | Note |
|---|---|---|
| QoS Link Family | 1 | The network type for the QoS Parameter. Type 0 indicates Generic link type. Other values are defined in Table 9 |
| QoS Parameter subtype | 1 | The subtype of QoS parameter.<br>The QoS parameters for the Generic link type:<br>0: Number of supported QoS<br>1: Throughput (kbps)<br>2: Packer Error Rate<br>3: CoS Minimum Packet Transfer Delay (ms)<br>4: CoS Average Packet Transfer Delay (ms)<br>5: CoS Maximum Packet Transfer Delay (ms)<br>6: CoS Packet Transfer Delay Jitter (ms)<br>7: CoS Packet Loss Rate<br>8-255: Reserved |

As shown in Table 3, Handover Parameter for link quality degradation includes NW Quality Degradation Threshold 1 and NW Quality Degradation Threshold 2 to be applied to the radio communication network for which the current radio link RL is set. Note that MIH_Configure_Link. request can consider and define one service equality requirement value in addition to the threshold condition of the communication quality thresholds (InitiateAction Threshold, ExecuteAction Threshold) defined in IEEE802.21.

Note that the mobility manager 14 is not involved with the setting of specific values of NW Quality Degradation Threshold 1 and NW Quality Degradation Threshold 2. The specific values of NW Quality Degradation Threshold 1 and NW Quality Degradation Threshold 2 are set in the MIH function unit 13. NW Quality Degradation Threshold 1 is used to determine whether or not to start a connection to the radio communication network of the handover destination. NW Quality Degradation Threshold 2 is used to determine whether or not to actually execute a handover.

In step S105, the mobility manager 14 can notify the MIH function unit 13 of multiple service quality requirement values (for example, Bandwidth: 4 kbps, 8 kbps, 12 kbps and so forth) on the basis of the QoS parameters and policy information transmitted from the higher layer entity 15. Specifically, the mobility manager 14 transmits MIH_QoS_Threshold. request to the MIH function unit 13.

FIG. 6 shows a format of MIH_QoS_Threshold. request and a configuration example of MIH_QoS_Threshold. request. MIH_QoS_Threshold. request is used when a communication service or an IP application to be executed in the higher layer entity 15 requests a handover to the MIH function unit 13 or control of each type of parameters without using the threshold condition with the communication quality thresholds (InitiateAction Threshold, ExecuteAction Threshold).

In step S107, the MIH function unit 13 transmits, to the radio link controller 12A, the communication quality thresholds (InitiateAction Threshold, Execution Threshold, for example) in the lower layer (L2) or the communication quality threshold corresponding to the service quality requirement value on the basis of MIH_Configure_Link.requset or MIH_QoS_Threshold. request transmitted from the mobility manager 14.

Specifically, the MIH function unit 13 transmits Link_Configure_Threshold. request to the radio link controller 12A. Note that when the MIH function unit 13 receives MIH_QoS_Threshold. request from the mobility manager 14, the MIH function unit 13 includes the communication quality threshold (such as RSSI ox CINR) of the link layer (L2) corresponding to the service quality requirement value into Link_Configure_Threshold. request and then transits Link_Configure_Threshold. request to the radio link controller 12A. In other words, in step S109, the MIH function unit 13 sets the communication quality threshold of the lower layer (L2) corresponding to the service quality requirement value on the basis of the service quality requirement value transmitted from the mobility manager 14.

FIG. 7 shows a format of Link_Configure_Threshold. request. Tables 6 to 9 show the content of each parameter included in Link_Configure_Threshold. request. NW Quality Degradation Threshold 1 described above corresponds to InitiateAction Threshold and NW Quality Degradation Threshold 2 described above corresponds to ExecuteAction Threshold in Link_Configure_Threshold. request.

TABLE 6

| Name | Type | Valid Range | Description |
| --- | --- | --- | --- |
| Link Parameter List | List | N/A | A list of following set of parameters: Link Parameter Type, Initiate Action Threshold, Rollback Action Threshold, Execute Action Threshold, Logical equation to Judge listed parameters, Interval for Judgment |
| Link Parameter Type | A pair of {Link Type:ParamType} Examples: {Generic SINR}, {Generic RSSI}, {EV-DO:DRC}, {EV-DO:Tx_Power}, {EV-DO:DRC_Lock} | N/A | Parameters for which thresholds may be set. |
| Priority of Link | Each Link name is followed by Priority value {lower value means higher priority} Examples: CDMA2000 1xEV-DO = 1 WiFi = 2 IEEE 802.16e = 3 | N/A | Priority is described per Link. |
| Initiate Action Threshold | Threshold values are dependent on parameter for which they are being set. | N/A | Threshold value which may MIHF Users to start "setup type activities in response to actual parameter values crossing this threshold. |
| Execute Action Threshold | Threshold values are dependent on parameter for which they are being set | N/A | Threshold value which may cause MIHF Users to execute taking appropriate action if the actual parameter values cross this threshold. |

TABLE 7

| Name | Type | Valid Range | Description |
| --- | --- | --- | --- |
| Logical equation to judge listed parameters with Initiate Action Threshold | Logical equation for Initiate Action | N/A | Logical equation by which MIHF may judge each multiple parameters that cross the Initiate Action Threshold. If equation is met, Link_Parameters_Report.indication will be sent to MIHF. |
| Logical equation to judge listed Parameter with Execute Action Threshold | Logical equation for Execute Action | N/A | Logical equation by which MIHF may judge each multiple parameters that cross the Execute Action Threshold. If equation is met, Link_Parameters_Report.Indication will be sent to MIHF. |
| Interval for judgment | Interval time | N/A | Interval time during which each parameters are collected and logical equation are evaluated. |
| QoS_Related_Threshold 1 | Threshold values are dependent on parameter for which they are being set | N/A | Threshold value which may cause MIH User to appropriate QoS action. |
| QoS_Related_Threshold 2 | Threshold values are dependent on parameter for which they are being set | N/A | Threshold value which may cause MIH User to appropriate QoS action. |
| QoS_Related_Threshold 3 | Threshold values are dependent on parameter for which they are being set | N/A | Threshold value which may cause MIH User to appropriate QoS action. |
| QoS_Related_Threshold 4 | Threshold values are dependent on parameter for which they are being set | N/A | Threshold value which may cause MIH User to appropriate QoS action. |
| QoS_Related_Threshold 5 | Threshold values are dependent on parameter for which they are being set | N/A | Threshold value which may cause MIH User to appropriate QoS action. |
| QoS_Related_Threshold 6 | Threshold values are dependent on parameter for which they are being set | N/A | Threshold value which may cause MIH User to appropriate QoS action. |
| QoS_Related_Threshold 7 | Threshold values are dependent on parameter for which they are being set | N/A | Threshold value which may cause MIH User to appropriate QoS action. |
| QoS_Related_Threshold 8 | Threshold values are dependent on parameter for which they are being set | N/A | Threshold value which may cause MIH User to appropriate QoS action. |
| QoS_Related_Threshold 9 | Threshold values are dependent on parameter for which they are being set | N/A | Threshold value which may cause MIH User to appropriate QoS action. |

TABLE 8

| Name | Type | Valid Range | Description |
| --- | --- | --- | --- |
| Logical equation to judge listed parameters for QoS_Related_Threshold 1 | Logical equation | N/A | Logical equation by which MIHF may judge each multiple parameters that cross the each Thresholds for QoS. If equation is met, Link_Parameters_Report.indication will be sent to MIHF. |

TABLE 8-continued

| Name | Type | Valid Range | Description |
|---|---|---|---|
| Logical equation to judge listed parameters for QoS_Related_Threshold 2 | Logical equation | N/A | Logical equation by which MIHF may judge each multiple parameters that cross the each Thresholds for QoS. If equation is met, Link_Parameters_Report.indication will be sent to MIHF. |
| Logical equation to judge listed parameters for QoS_Related_Threshold 3 | Logical equation | N/A | Logical equation by which MIHF may judge each multiple parameters that cross the each Thresholds for QoS. If equation is met, Link_Parameters_Report.indication will be sent to MIHF. |
| Logical equation to judge listed parameters for QoS_Related_Threshold 4 | Logical equation | N/A | Logical equation by which MIHF may judge each multiple parameters that cross the each Thresholds for QoS. If equation is met, Link_Parameters_Report.indication will be sent to MIHF. |
| Logical equation to judge listed parameters for QoS_Related_Threshold 5 | Logical equation | N/A | Logical equation by which MIHF may judge each multiple parameters that cross the each Thresholds for QoS. If equation is met, Link_Parameters_Report.indication will be sent to MIHF. |

TABLE 9

| Name | Type | Valid Range | Description |
|---|---|---|---|
| Logical equation to judge listed parameters for QoS_Related_Threshold 6 | Logical equation | N/A | Logical equation by which MIHF may judge each multiple parameters that cross the each Thresholds for QoS. If equation is met, Link_Parameters_Report.indication will be sent to MIHF. |
| Logical equation to judge listed parameters for QoS_Related_Threshold 7 | Logical equation | N/A | Logical equation by which MIHF may judge each multiple parameters that cross the each Thresholds for QoS. If equation is met, Link_Parameters_Report.indication will be sent to MIHF. |
| Logical equation to judge listed parameters for QoS_Related_Threshold 8 | Logical equation | N/A | Logical equation by which MIHF may judge each multiple parameters that cross the each Thresholds for QoS. If equation is met, Link_Parameters_Report.indication will be sent to MIHF. |
| Logical equation to judge listed parameters for QoS_Related_Threshold 9 | Logical equation | N/A | Logical equation by which MIHF may judge each multiple parameters that cross the each Thresholds for QoS. If equation is met, Link_Parameters_Report.indication will be sent to MIHF. |

Note:
RollbackActionThreshold is deleted.

The MIH function unit 13 performs mapping of a logical equation for judgment on each of the service quality requirement values on the basis of the QoS parameters and policy information in the higher layer entity 15, and then transmits the mapped service quality requirement values and the logical equations for judgment to the radio link controllers 12A to 12C as the threshold conditions of the quality of service (QoS).

Tables 10 to 12 show specific examples of Link_Configure_Threshold. request.

TABLE 10

| | Radio Communication Network 100 (e.g. CDMA 1x EV-DO) | Radio Communication Network 200 (e.g. IEEE 802.16e) | Radio Communication Network 300 (e.g. WLAN) |
|---|---|---|---|
| Radio Parameter for QoS Related Threshold 1 (4 kbps) | {Previous Rate, Previous DRC, Current DRC} | {Rate, CINR} | {Rate, CIR} |
| Logical Equation for Judgment | P = Current DRC * Previous Rate/Previous DRC * Fr ≦ 4 kbps | Rate ≦ 4 kbps & CINR ≦ −2 dB | Rate ≦ 4 kbps & CINR ≦ −2 dB |
| Interval for Judgment | 500 ms | 500 ms | 500 ms |
| Radio Parameter for QoS Related Threshold 2 (8 kbps) | {Previous Rate, Previous DRC, Current DRC} | {Rate, CINR} | {Rate, CIR} |
| Logical Equation for Judgment | P = Current DRC * Previous Rate/Previous DRC * Fr ≦ 8 kbps | Rate ≦ 8 kbps & CINR ≦ −1 dB | Rate ≦ 8 kbps & CINR ≦ −1 dB |

TABLE 10-continued

|  | Radio Communication Network 100 (e.g. CDMA 1x EV-DO) | Radio Communication Network 200 (e.g. IEEE 802.16e) | Radio Communication Network 300 (e.g. WLAN) |
| --- | --- | --- | --- |
| Interval for Judgment | 500 ms | 500 ms | 500 ms |
| Radio Parameter for QoS Related Threshold 3 (12 kbps) | {Previous Rate, Previous DRC, Current DRC} | {Rate, CINR} | {Rate, CIR} |
| Logical Equation for Judgment | P = Current DRC * Previous Rate/Previous DRC * Fr ≦ 12 kbps | Rate * Fr ≦ 12 kbps & CINR ≦ 0 dB | Rate * Fr ≦ 12 kbps & CINR ≦ 0 dB |
| Interval for Judgment | 500 ms | 500 ms | 500 ms |

TABLE 11

|  | Radio Communication Network 100 (e.g. CDMA 1x EV-DO) | Radio Communication Network 200 (e.g. IEEE 802.16e) | Radio Communication Network 300 (e.g. WLAN) |
| --- | --- | --- | --- |
| Radio Parameter for QoS Related Threshold 4 (16 kbps) | {Previous Rate, Previous DRC, Current DRC} | {Rate, CINR} | {Rate, CIR} |
| Logical Equation for Judgment | P = Current DRC * Previous Rate/Previous DRC * Fr ≦ 16 kbps | Rate * Fr ≦ 16 kbps & CINR ≦ 1 dB | Rate * Fr ≦ 16 kbps & CINR ≦ 1 dB |
| Interval for Judgment | 500 ms | 500 ms | 500 ms |
| Radio Parameter for QoS Related Threshold 5 (24 kbps) | {Previous Rate, Previous DRC, Current DRC} | {Rate CINR} | {Rate, CIR} |
| Logical Equation for Judgment | P = Current DRC * Previous Rate/Previous DRC * Fr ≦ 24 kbps | Rate * Fr ≦ 24 kbps & CINR ≦ 2 dB | Rate * Fr ≦ 24 kbps & CINR ≦ 2 dB |
| Interval for Judgment | 500 ms | 500 ms | 500 ms |
| Radio Parameter for QoS Related Threshold 6 (32 kbps) | {Previous Rate, Previous DRC, Current DRC} | {Rate, CINR} | {Rate, CIR} |
| Logical Equation for Judgment | P = Current DRC * Previous Rate/Previous DRC * Fr ≦ 32 kbps | Rate * Fr ≦ 32 kbps & CINR ≦ 3 dB | Rate * Fr ≦ 32 kbps & CINR ≦ 3 dB |
| Interval for Judgment | 500 ms | 500 ms | 500 ms |

TABLE 12

|  | Radio Communication Network 100 (e.g. CDMA 1x EV-DO) | Radio Communication Network 200 (e.g. IEEE 802.16e) | Radio Communication Network 300 (e.g. WLAN) |
| --- | --- | --- | --- |
| Radio Parameter for QoS Related Threshold 7 (200 ms) | RSSI, Tx_Power | RSSI, Tx_Power | RSSI |
| Logical Equation for Judgment | RSSI ≦ −80 dBm & Tx_Power ≧ 15 dBm | RSSI ≦ −80 dBm & Tx_Power ≧ 15 dBm | RSSI ≦ −80 dBm |
| Interval for Judgment | 500 ms | 500 ms | 500 ms |
| Radio Parameter for QoS Related Threshold 8 (300 ms) | RSSI, Tx_Power | RSSI, Tx_Power | RSSI |
| Logical Equation for Judgment | RSSI ≦ −90 dBm & Tx_Power ≧ 18 dBm | RSSI ≦ −85 dBm & Tx_Power ≧ 18 dBm | RSSI ≦ −85 dBm |
| Interval for Judgment | 500 ms | 500 ms | 500 ms |
| Radio Parameter for QoS Related Threshold 9 (400 ns) | RSSI, Tx_Power | RSSI, Tx_Power | RSSI |
| Logical Equation for Judgment | RSSI ≦ −95 dBm & Tx_Power ≧ 20 dBm | RSSI ≦ −90 dBm & Tx_Power ≧ 20 dBm | RSSI ≦ −90 dBm |
| Interval for Judgment | 500 ms | 500 ms | 500 ms |

In Tables 10 to 12, Previous Rate and Previous Data Rate Control (Previous DRC) are an average communication rate and an average DRC among the most recent 500 ms (when Initial is 500 ms) using the current point as the basis. Furthermore, Fr indicates a link header redundancy. Specifically, provided that an IP packet length transmitted to the radio link controllers 12A to 12C is Lip, a header length added in the radio link controllers 12A to 12C is HLlnk and a communication rate measured by the radio link controllers 12A to 12C is Rlnk, the communication rate Rip of the IP layer is calculated by Formula 1.

$$Fr = Lip/(Lip + HLlnk)$$

$$Rip = Rlnk * Fr \quad \text{(Formula 1)}$$

The specifying of a single QoS parameter for the MIH function unit 13 is conventionally defined in IEEE802.21. However, in this embodiment, multiple QoS parameters, the service quality requirement values of the QoS parameters (QoS_Related_Threshold) and logical equations for judgment (logical equations to judge listed parameters) associated with the service quality requirement values are associated with one another in the MIH function unit 13.

Specifically, InitiateAction Threshold and ExecuteAction Threshold are not involved at all with the service quality requirement values specified by the mobility manager 14 and the higher layer entity 15 (MIH user). InitiateAction Threshold and ExecuteAction Threshold are thresholds defined in consideration of the communication quality in the link layer (L2).

On the other hand, QoS_Related_Threshold is a threshold that has been mapped by the MIH function unit 13 onto the communication quality in the link layer (L2) for the service quality requirement value specified by the mobility manger 14 or the higher layer entity 15. For example, a bandwidth (communication rate) is specified as the service quality requirement value specified by the mobility manager 14 or the higher layer entity 16. Then, the communication quality thresholds (RSSI or CINR, for example) of the multiple link layers (L2) corresponding to the aforementioned bandwidth are mapped as QoS_Related_Threshold or logical equation to judge listed parameters.

In step S111, the radio link controller 12A transmits Link_Configure_Threshold. confirm to the MIH function unit 13. Link_configure_Threshold. confirm specifically indicates that the radio link controller 12A has normally received Link_Configure_Threshold. request.

In step S113, the MIH function unit 13 transmits MIH_Configure_Link_confirm to the mobility manager 14 upon receipt of Link_Configure_Threshold. confirm. MIH_Configure_Link_confirm specifically indicates that the MIH function unit 13 has normally received MIH_Configure_Link. request. In addition, in step S115, MIH function unit 13 transmits MIH_QoS_Threshold. confirm to the mobility manager 14. MIH_QoS_Threshold. confirm specifically indicates that the MIH function unit 13 has normally received MIH_QoS_Threshold. request.

In step S117, the radio link controller 12A detects that the communication quality of the radio link RL connected to the radio communication network 100 (1xEV-DO) has reached InitiateAction Threshold.

In step S119, the radio link controller 12A notifies the MIH function unit 13 that the communication quality of the radio link RL has reached InitiateAction Threshold. Specifically, the radio link controller 12A transmits Link_Parameters_Report indication to the MIH function unit 13.

FIG. 8 shows a format of Link_Parameters-_Report. indication. Table 13 shows the content of each parameter included in Link_Parameters_Report. indication.

TABLE 13

| Name | Type | Valid Range | Description |
| --- | --- | --- | --- |
| Parameter Type | INTEGER | N/A | Parameter for which threshold has been crossed, |
| old Value of Link Parameter | Threshold values are dependent on parameter for which they are being set. | N/A | Old parameter value |
| new Value Of Link Parameter | Threshold values are dependent on parameter for which they are being set. | N/A | New parameter value |
| Kind of action | INTEGER | N/A | 1: Initiate Action<br>2: Execute Action.<br>3. QoS_Action1<br>*<br>*<br>*<br>*<br>N + 2: QoS_Action N |
| Logical equation to judge listed parameters | Logical equation | N/A | Logical equation for QoS judgment |

In step S121, the MIH function unit 13 transmits MIH_Link_Parameters_Report. indication to the mobility manager 14 upon receipt of Link_Parameters Report. indication.

FIG. 9 shows a format of MIH_Link_Parameters_Report indication. In addition, Tables 14 and 15 show the content of s each parameter included in MIH_Link_Parameters_Report. indication.

TABLE 14

| Name | Type | Valid range | Description |
| --- | --- | --- | --- |
| Source Identifier | MIHF ID | N/A | This identifies the invoker of this primitive which can be either local MIHF or a remote MIHF. |
| Destination Identifier | MIH User ID | N/A | This identifies the final receiver of this primitive among MIH Users. |
| Link Identifier | LINK ID | N/A | Identifier of the link associated with the event. |
| Link Parameters Status List | LIST | N/A | A list of Link Parameters Status, as defined in Table 38-2. |
| QoS Parameters Status List | LIST | | A list of QoS Parameters Status, as defined In Table 38-2. |

TABLE 15

Table 38-2 Elements of link parameters status

| Name | Type | Valid range | Description |
| --- | --- | --- | --- |
| Parameter Type | INTEGER | 0-255 | Parameter being reported, as defined in Table 12 |
| Current Value | Values dependent on Parameter Type | N/A | The current value of the parameter. |
| Threshold Crossed for Link Parameter | ENUMERATED | 0-2 | Provided when this is a threshold-crossing event.<br>0: Initiate Action Threshold crossed.<br>1: Execute Action Threshold crossed |
| Threshold Crossed for QoS Parameter | ENUMERATED | 0-255 | Provided when this is a threshold-crossing event.<br>0: reserved<br>11: Threshold 1 for QoS parameter 1<br>*<br>*<br>n1: Threshold n for QoS parameter 1<br>1m: Threshold 1 for QoS parameter m<br>*<br>*<br>nm: Threshold n for QoS parameter m |

In step S123, the mobility manager 14 transmits MIH_Link_Up. request to the MIH function unit 13. MIH_Link_Up. request specifically requests a connection to the radio communication network 200 (WiMAX) of the handover destination in order to start preparation for the handover. Note that MIH_Link_Up. request is not defined in IEEE802.21, but a newly defined command.

In step S125, the MIH function unit 13 instructs the radio link controller 12B on the connection to the radio communication network 200. Specifically, the MIH function unit 13 transmits Link_Up. request to the radio link controller 12B.

In step S127, the radio link controller 12B sets the radio link RL for the radio communication network 200.

In step S129, the radio link controller 12B transmits Link_Up. indication to the MIH function unit 13 upon completion of the setting of the radio link RL for the radio communication network 200.

In step S131, the MIH function unit 13 notifies the mobility manager 14 that the setting of the radio link RL for the radio communication network 200 is completed, upon receipt of Link_Up. indication. Specifically, the MIH function unit 13 transmits MIH_Link_Up. indication to the mobility manager 14. Note that MIH_Link_Up. indication is not defined in IEEE802.21, but a newly defined notification.

In step S133, the radio link controller 12A detects that the communication quality of the radio link RL connected to the radio communication network 100 (1xEV-DO) has reached ExecuteAction Threshold.

In step S135, the radio link controller 12A notifies the MIH function unit 13 that the communication quality of the radio link RL has reached InitiateAction Threshold. Specifically, the radio link controller 12A transmits Link_Parameters_Report. indication to the MIH function unit 13.

In step 137, the MIH function unit 13 transmits MIH_Link_Parameters_Report. indication to the mobility manager 14 upon receipt of Link_Parameters_Report. indication.

In step 139, the mobility manager 14 transmits MIH_Switch. request to the MIH function unit 13 in order to start a handover to the radio communication network 200.

In step S141, the MIH function unit 13 transmits MIR_Switch. confirm to the mobility manager 14. MIH_Switch. confirm specifically indicates that the MIH function unit 13 has normally received MIH_Switch. request.

In step S143, the MIH function unit 13 and the radio link controller 12B execute the handover from the radio communication network 100 to the radio communication network 200, that is, the switching from the radio communication network 100 to the radio communication network 200.

In step S145, the MIH function unit 13 transmits MIH.Switch.report to the mobility manager 14. MIH.Switch.report specifically indicates that the switching to the radio communication network 200 is completed.

In step S147, the mobility manager 14 transmits MIH _ Link_Down. request to the MIH function unit 13 upon receipt of MIH.Switch.report. MIH_Link_Down. request specifically requests a disconnection of the radio link RL set for the radio commLunication network 100 from the radio communication network 100. Note that MIH_Link_Down. request is not defined in IEEE802.21, but a newly defined command.

In step S149, the MIH function unit 13 transmits Link_Down. request to the radio link controller 12A in order to disconnect the radio link RL set for the radio communication network 100 from the radio communication network 100.

In step S151, the radio link controller 12A disconnects the radio link RL set for the radio communication network 100 from the radio communication network 100.

In step S153, the radio link controller 12A transmits Link_Down, indication to the MIH function unit 13 in response to the fact that the radio link controller 12A has disconnected the radio link RL set for the radio communication network 100 from the radio communication network 100.

In step S155, upon receipt of Link_Down. indication, the MIH function unit 13 notifies the mobility manager 14 that the radio link controller 12A has disconnected the radio link RL set for the radio communication network 100 from the radio communication network 100. Specifically, the MIH function unit 13 transmits MIH_Link_Down. indication to the mobility manager 14.

(3.2) Operation Example 2

In Operation Example 1 described above, the preparation for a handover is started when the condition that the communication quality of the radio link RL has reached InitiateAction Threshold (refer to step S117) is satisfied. Then, the handover is started when the condition that the communication quality thereof has reached ExecuteAction Threshold (step S133) is satisfied. In Operation Example 2, instead of InitiateAction Threshold and ExecuteAction Threshold, the handover is executed on the basis of multiple thresholds (QoS_Related_Threshold 1 to 9) associated with the service quality requirement values.

Specifically, as shown in Tables 7 to 9 and Tables 10 to 12, nine thresholds, which are QoS_Related_Threshold 1 to 9 (P=Current DRC*Previous Rate/Previous DRC*Fr≦16 kbps shown in Table 11, for example), can be set in this embodiment. QoS_Related_Threshold 1 to 9 can be associated with predetermined service quality requirement values (Bandwidth: 8 kbps, for example), respectively.

Figure 4:
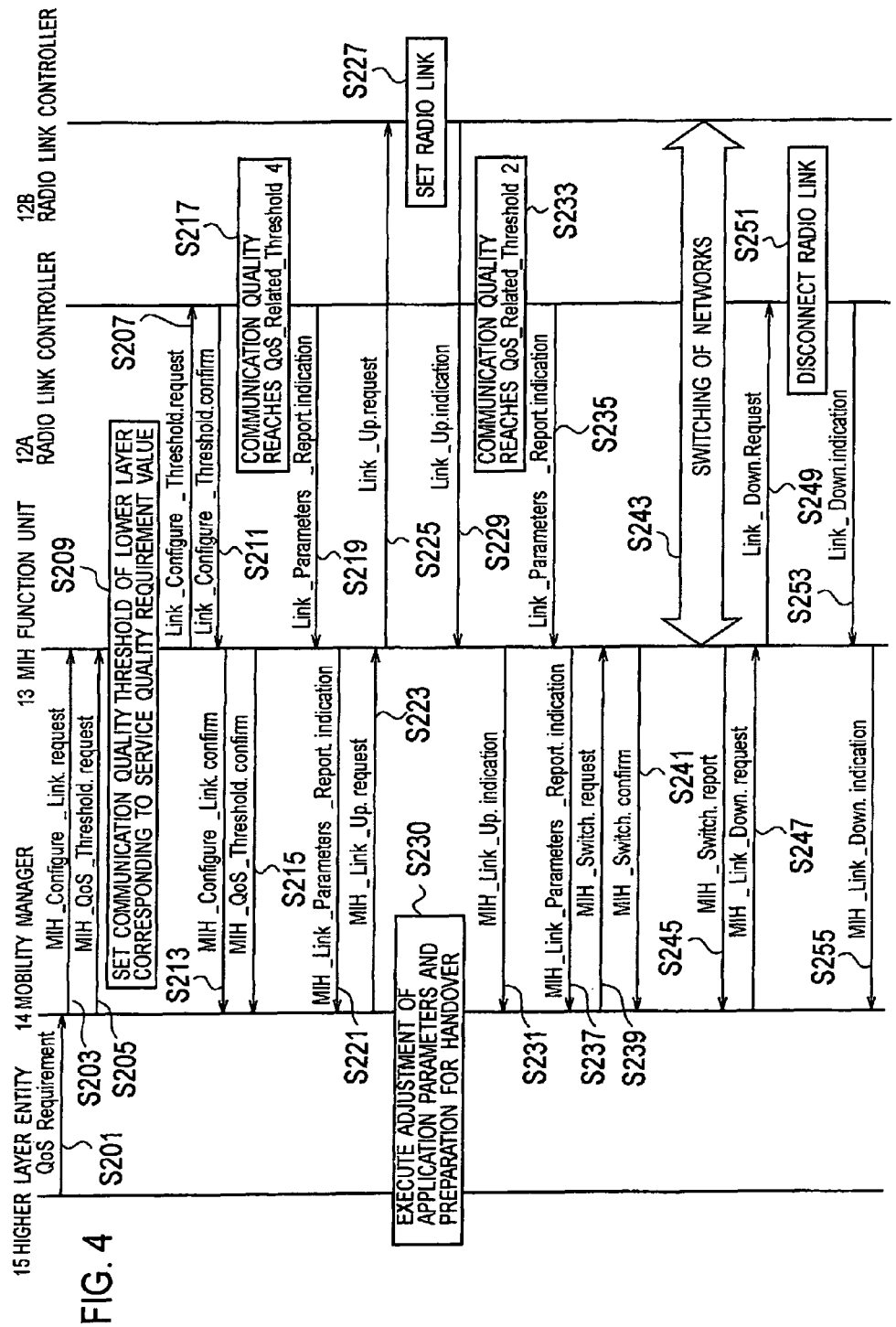
FIG. 4 is an internal sequence diagram when the radio communication terminal 10 according to the embodiment of the present invention executes a handover from the radio communication network 100 to the radio communication network 200 (operation Example 2)

FIG. 4 is an internal sequence diagram when the radio communication terminal 10 executes a handover from the radio communication network 100 to the radio communication network 200 on the basis of QoS_Related_Threshold. Note that a description below will be mainly given of a portion different from that of Operation Example 1 shown in FIG. 3.

The processing in steps S201, S203 ... S215 is substantially the same as that of steps S101, S103, ... S115 shown in FIG. 3. However, in step S201, an assumption is made that the higher layer entity 15 requests Bandwidth: 8 kbps as a service quality requirement value. In addition, in step S207, the MIH function unit 13 transmits a logical equation for judgment to the radio link controller 12A along with QoS_Related_Threshold 1 to 9. The logical equation for judgment is specifically used to determine whether or not the communication quality of the radio link RL has reached QoS_Related_Threshold 1 to 9.

Specifically, the MIH function unit 13 performs mapping of the logical equations for judgment onto each service quality requirement value in accordance with the contents of Tables 10 to 12 on the basis of the QoS parameter and policy information in the higher layer entity 15. In addition, the MIH function unit 13 transmits combinations of the mapped service quality requirement values and the logical equations for judgment to the radio link controller 12A.

In step S217, the radio link controller 12A detects that the communication quality of the radio link RL connected to the radio communication network 100 (1xEV-DO) has reached QoS_Related_Threshold 4.

Specifically, the radio link controller 12A determines that the communication quality at the radio link RL has reached QoS_Related_Threshold 4 when the DRC value (unit: bps) in the radio link RL satisfies the logical equations for judgment P=Current DRC*Previous Rate/Previous DRC*Fr≦16 kbps (refer to Table 11).

In step S219, the radio link controller 12A notifies the MIH function unit 13 that the communication quality of the radio link RL has reached QoS_Related_Threshold 4. specifically, the radio link controller 12A transmits Link_Parameters_Report. indication to the MIH function unit 13. As shown in FIG. 8 and Table 13, the definition of Link_Parameters_Report. indication is extended (QoS_Action 1 to N) in this embodiment, so as to explicitly show one of QoS_Related_Threshold 1 to 9.

In step S221, the MIH function unit 13 transmits MIH_Link_Parameters_Report. indication to the mobility manager 14 upon receipt of Link_Parameters_Report. indication. Specifically, as shown in FIG. 9 and Tables 14 to 15, the definition of MIH_Link_Parameters_Report. indication is extended in this embodiment so that QoS Parameters Status List can be added and the type of QoS parameter and satisfied condition can be notified.

The processing of steps S223, S225, S227, and S229 is substantially the same as the processing of steps S123, S125, S127, and S129 shown in FIG. 3.

In step S230, the mobility manager 14 executes adjustment of setting contents of the higher layer entity 15, that is, adjustment of parameters of an IP application (IP phone application, for example) currently being executed in the higher layer entity 15.

In this embodiment, the mobility manager 14 requests the higher layer entity 15 to execute changing of encoding rate of the codec, playback speed of decoded audio information, jitter buffer capacity or the like in order to correspond the setting to the radio environment (communication rate) specified by QoS_Related_Threshold 4. The higher layer entity 15 changes QoS parameters on the basis of the request from the mobility manager 14. For example, if the higher layer entity 15 is TCP, the higher layer entity 15 changes the congestion window size. Alternatively, to if the higher layer entity 15 is an IP phone application, the higher layer entity 15 changes the encoding rate of the codec.

The processing of step S231 is the same as the processing of step S131 shown in FIG. 3. In step S233, the radio link controller 12A detects that the communication quality of the radio link RL connected to the radio communication network 100 (1xEV-DO) has reached QoS_Related_Threshold 2.

Specifically, the radio link controller 12A determines that the communication quality of the radio link RL has reached QoS_Related_Threshold 2 when the DRC value (unit: bps) in the radio link RL satisfies the logical equations for judgment P=Current DRC*Previous Rate/Previous DRC*Fr≦8 kbps (refers to Table 10).

In step S235, the radio link controller 12A notifies the MIH function unit 13 that the communication quality of the radio link RL has reached QoS_Related_Threshold 2. Note that the processing content in this case is the same as that of step S219.

In step S237, the MIH function unit 13 transmits MIH_Link_Parameters_Report. indication to the mobility manager 14. Note that the processing content in this case is the same as that of step S221.

In step S239, the mobility manager 14 transmits MIH_Switch request to the MIH function unit 13 in order to start a handover to the radio communication network 200. Specifically, the mobility manager 14 determines to execute the handover to the radio communication network 200 in response to the fact that the communication quality of the radio link RL has reached the service quality requirement value (Bandwidth: 8 kbps) corresponding to QoS_Related_Threshold 2. Note that in step S239, the mobility manager 14 may execute adjustment of parameters of an IP application currently being executed in the higher layer entity 15, as in the case of step S230.

The processing in steps S241, S243, ... S255 are substantially the same as the processing of steps S141, ... S155 as shown in FIG. 3.

(3.3) Modification Example

Although the communication quality threshold (InitiateAction Threshold, ExecuteAction Threshold or QoS_Related_Threshold) is determined on the basis of QoS parameters in Operation Examples 1 and 2 described above, the MIH function unit 13 may determine the communication quality threshold on the basis of policy information.

Table 16 shows radio parameters, communication quality thresholds (InitiateAction Threshold, ExecuteAction Threshold) and logical equations for judgment, of each of the radio communication networks, based on the communication path (communication medium) selection policy when an IP phone application is executed.

TABLE 16

| | Radio Communication Network 100 (e.g. CDMA 1x EV-DO) | Radio Communication Network 200 (e.g. IEEE 802.16e) | Radio Communication Network 300 (e.g. WLAN) |
|---|---|---|---|
| Radio Parameter | {SINR, RSSI, DRC, Tx_Power, DRC_Lock} | {SINR, RSSI} | {CIR, RSSI} |
| Threshold (Initiate Action) | {+2 dB, −70 dBm, 7, 10 dBm, 0.8} | {3 dB, −70 dBm} | {3 dB, −75 dBm} |
| Threshold (Execute Action) | {−3 dB, −75 dBm, 5, 15 dBm, 0.9} | {−2 dB, −75 dBm} | {0 dB, −80 dBm} |
| Logical Judgment Equation (Initiate Action) | (SINR & RSSI & DRC)\|\| (Tx_Power & DRC_Lock) | (SINR & RSSI) | (CIR & RSSI) |
| Logical Judgment Equation (Execute Action) | (SINR & RSSI & DRC)\|\| (Tx_Power & DRC_Lock) | (SINR & RSSI) | (CIR & RSSI) |

As shown in Table 16, the radio parameters, communication quality thresholds and logical equations for judgment are different depending on the types of radio communication networks even with the same communication path policy. Accordingly, the MIH function unit 13 needs to have such a table for each policy.

Table 17 shows radio parameters, communication quality thresholds (InitiateAction Threshold, ExecuteAction Threshold) and logical equations for judgment of each of the radio communication networks based on the communication path (communication medium) selection policy when a streaming distribution application is executed.

(4) Effects and Advantages

According to the radio communication terminal 10, when the MIH function unit 13 is notified by the radio link controllers 12A to 12C that the communication quality of the radio link RL being respectively set thereto has reached the communication quality threshold, the MIR function unit 13 then notifies the mobility manager 14 that the communication quality of the radio link RL has reached the service quality requirement value corresponding to the communication quality threshold.

Accordingly, the mobility manager 14 can promptly determine whether or not to change the service quality requirement

TABLE 17

| | Radio Communication Network 100 (e.g. CDMA 1x EV-DO) | Radio Communication Network 200 (e.g. IEEE 802.16e) | Radio Communication Network 300 (e.g. WLAN) |
|---|---|---|---|
| Radio Parameter | {SINR, RSSI, DRC, Tx_Power, DRC_Lock} | {SINR, RSSI, Successful ratio of DL-MAP receive, Rate, Modulation class, Tx_Power} | {CIR, RSSI, PER, Rate} |
| Threshold (Initiate Action) | {0 dB, −80 dBm, 6, 15 dBm, 0.8} | {3 dB, −70 dBm, 0.9, 500 kbps, QPSK ¾, 15 dBm} | {3 dB, −75 dBm, 0.1, 500 kbps} |
| Threshold (Execute Action) | {−5 dB, −90 dBm, 4, 23 dBm, 0.8} | {−2 dB, −80 dBm, 0.8, 200 kbps, QPSK ½, 23 dBm} | {0 dB, −85 dBm, 0.1, 500 kbps} |
| Logical Judgment Equation (Initiate Action) | (SINR & RSSI & DRC)\|\| (Tx_Power & DRC_Lock) | (SINR & RSSI & Successful ratio of DL-MAP receive)\|\|Tx_Power | (CIR & PER)\|RSSI |
| Logical Judgment Equation (Execute Action) | (SINR & RSSI & DRC)\|\| (Tx_Power & DRC_Lock) | (SINR & RSSI & Successful ratio of DL-MAP receive)\|\|Tx_Power | (CIR & PER)\|RSSI |

In addition, Table 18 shows radio parameters, communication quality thresholds (InitiateAction Threshold, ExecuteAction Threshold) and logical equations for judgment of each of the radio communication networks based on the communication path (communication medium) selection policy when priority for the selection of the radio communication network is set as to satisfy: radio communication network 300>radio communication network 200>radio communication network 100.

value in the mobility manager 14 or the service quality requirement value for the higher layer entity 15, or to execute a handover when being notified by the MIH function unit 13 that the communication quality of the radio link RL has reached the service quality requirement value.

In other words, since the MIH function unit 13 associates communication quality thresholds with service quality requirement values, the mobility manager 14 does not have to recognize the relationships between each of the communica-

TABLE 18

| | Radio Communication Network 100 (e.g. CDMA 1x EV-DO) | Radio Communication Network 200 (e.g. IEEE 802.16e) | Radio Communication Network 300 (e.g. WLAN) |
|---|---|---|---|
| Radio Parameter | {SINR, RSSI, DRC} | {SINR, RSSI, Rate, Modulation class} | {CIR, RSSI, PER, Rate} |
| Threshold (Initiate Action) | {+1 dB, −70 dBm, 7} | {3 dB, −70 dBm, 700 kbps, 16QAM ½} | {3 dB, −70 dBm, 0.05, 700 kbps} |
| Threshold (Execute Action) | {−3 dB, −80 dBm, 5} | {−2 dB, −75 dBm, 400 kbps, QPSK ¾} | {0 dB, −75 dBm, 0.1, 400 kbps} |
| Logical Judgment Equation (Initiate Action) | (SINR & RSSI & DRC)\| | (SINR & RSSI & Rate) | (CIR & PER & RSSI) |
| Logical Judgment Equation (Execute Action) | (SINR & RSSI & DRC) | (SINR & RSSI & Rate) | (CIR & PER & RSSI) | tion quality thresholds and each of the service quality requirement values, which are dependent on the characteristics of the radio communication networks 100, 200 and 300. The mobility manager 14 can thus execute processing such as a handover appropriate for the communication quality of the radio link RL on the basis of the service quality requirement values. Furthermore, since the mobility manager 14 does not have to recognize the relationships between each of the communication quality thresholds and each of the service quality requirement value, which are dependent on the characteristics of the radio communication networks 100, 200 and 300, it is possible to suppress the development costs of the mobility manager 14.

In this embodiment, the mobility manager 14 executes a handover to another radio communication network, or changes the setting contents of an application currently being executed in the higher layer entity 15 when being notified by the MIH function unit 13 that the communication quality of the radio link RL has reached the service quality requirement value corresponding to the communication quality threshold. The mobility manger 14 can thus select processing (execution of the handover or changing of so the setting contents of the application) appropriate for the condition of the radio link RL or the type of the application currently being executed in the higher layer entity 15.

(5) Other Embodiments

As described above, the content of the present invention has been disclosed through one embodiment of the present invention. However, the descriptions and the drawings constituting a part of the disclosure should not be construed to limit the present invention. Various alternative embodiments should be obvious to so those skilled in the art from this disclosure.

For example, the nine types of QoS_Related_Threshold (QoS_Related_Threshold 1 to 9) are provided in the aforementioned embodiment. However, the number of types of QoS_Related_Threshold may be less than nine. Alternatively, the number of types of QoS_Related_Threshold may be more than nine.

Although a required bandwidth (communication rate) is used as a service quality requirement value in the aforementioned embodiment, the QoS parameter to be used as the service quality requirement value is not limited to the required bandwidth.

As described, obviously, the present invention includes various embodiments not described herein. The technical scope of the present invention is thus defined only by invention identifying matters according to the scope of claims appropriate to the descriptions above.

What is claimed is:

1. A radio communication apparatus executing a handover from a first radio communication network to a second radio communication network employing a radio communication scheme different from the first radio communication network, the apparatus comprising:
a link controller configured to set a radio link for any one of the first radio communication network and the second radio communication network;
a mobility manager configured to manage a mobility of the radio communication apparatus, the mobility from the first radio communication network to the second radio communication network; and
a handover controller configured to control a handover from the first radio communication network to the second radio communication network, wherein the mobility manager notifies the handover controller of a service quality requirement value in a higher layer entity of the mobility manager,
the handover controller sets a first communication quality threshold of the radio link to the link controller and a second communication quality threshold of the radio link to the link controller, the first communication quality threshold being associated with the service quality requirement value notified from the mobility manager, and the second communication quality threshold not being associated with the service quality requirement value notified from the mobility manager,
the link controller notifies to the handover controller that a communication quality of the radio link reaches the first communication quality threshold or the second communication quality threshold, when the communication quality of the radio link reaches the first communication quality threshold or the second communication quality threshold,
the handover controller notifies to the mobility manager that a condition for the handover from the first radio communication network to the second radio communication network is satisfied, when the handover controller is notified from the link controller that the communication quality of the radio link reaches the first communication quality threshold or the second communication quality threshold,
the mobility manager notifies to the link controller via the handover controller an instruction related to the handover from the first radio communication network to the second radio communication network, when the mobility manager is notified from the handover controller that the handover is satisfied, and
the first communication quality threshold and the second communication quality threshold are thresholds that relate to the handover from the first radio communication network to the second radio communication network.

2. The radio communication apparatus according to claim 1, wherein the mobility manager changes a setting content in the higher layer entity, when being notified from the handover controller that the service quality requirement value is satisfied.

3. The radio communication apparatus according to claim 1, wherein the handover controller sets a logical equation for determining whether or not the communication quality of the radio link reaches a predetermined threshold, to the link controller as the first communication quality threshold or the second communication quality threshold.

4. A communication control method for a radio communication apparatus including:
an MIH user configured to manage a mobility from a first radio communication network to a second radio communication network employing a radio communication scheme different from the first radio communication network;
an MIH function unit configured to control a handover from the first radio communication network to the second radio communication network; and
a link controller configured to set a radio link for one of the first radio communication network and the second radio communication network,
the method comprising the steps of:
notifying the MIH function unit, by the MIH user, of a service quality requirement value of a communication service to be executed;

setting, by the MIH function unit, a first communication quality threshold of the radio link to the link controller and a second communication quality threshold of the radio link to the link controller, the first communication quality threshold being associated with the service quality requirement value notified from the MIH user and the second communication quality threshold not being associated with the service quality requirement value notified from the MIH user;

notifying from the link controller to the MIH function that a communication quality of the radio link reaches the first communication quality threshold or the second communication quality threshold, when the communication quality of the radio link reaches the first communication quality threshold or the second communication quality threshold;

notifying from the MIH function to the MIH user that a condition for the handover from the first radio communication network to the second radio communication network is satisfied, when the MIH function is notified from the link controller that the communication quality of the radio link reaches the first communication quality threshold or the second communication quality threshold; and notifying from the MIH user to the link controller via the MIH function an instruction related to the handover from the first radio communication network to the second radio communication network, when the MIH user is notified from the MIH function that the condition for the handover is satisfied, wherein the first communication quality threshold and the second communication quality threshold are thresholds that relate to the handover from the first radio communication network to the second radio communication network.

5. The radio communication apparatus according to claim 1, wherein the second communication quality threshold includes a first threshold for initiating a preparation of the handover from the first radio communication network to the second radio communication network, and the mobility manager notifies to the link controller via the handover controller an instruction for setting up a connection to the second radio communication network, as the instruction related to the handover, when the mobility manager is notified from the link controller via the handover controller that the communication quality of the radio link reaches the first threshold.

6. The radio communication apparatus according to claim 1, wherein the second communication quality threshold includes a second threshold for initiating an execution of the handover from the first radio communication network to the second radio communication network, and the mobility manager notifies to the link controller via the handover controller a handover instruction for initiating the handover to the second radio communication network, as the instruction related to the handover, when the mobility manager is notified from the link controller via the handover controller that the communication quality of the radio link reaches the second threshold.

7. The radio communication apparatus according to claim 1, wherein the second communication quality threshold includes a first threshold for initiating a preparation of the handover from the first radio communication network to the second radio communication network and a second threshold for initiating an execution of the handover from the first radio communication network to the second radio communication network, the mobility manager notifies to the link controller via the handover controller an instruction for setting up a connection to the second radio communication network, as the instruction related to the handover, when the mobility manager is notified from the link controller via the handover controller that the communication quality of the radio link reaches the first threshold, and the mobility manager notifies to the link controller via the handover controller a handover instruction for initiating the handover to the second radio communication network, as the instruction related to the handover, when the mobility manager is notified from the link controller via the handover controller that the communication quality of the radio link reaches the second threshold.

* * * * *